United States Patent

Hayashi et al.

[11] Patent Number: 5,771,313
[45] Date of Patent: Jun. 23, 1998

[54] APPARATUS FOR AND METHOD OF DETECTING DOTTED IMAGE AREA USING TWO TYPES OF JUDGING AREAS

[75] Inventors: Shinji Hayashi; Masaya Fujimoto; Hidechika Kumamoto, all of Osaka, Japan

[73] Assignee: Mita Industrial Co., Ltd., Osaka, Japan

[21] Appl. No.: 556,840

[22] Filed: Nov. 2, 1995

[30] Foreign Application Priority Data

Nov. 16, 1994 [JP] Japan .................................... 6-282228
Nov. 16, 1994 [JP] Japan .................................... 6-282229

[51] Int. Cl.[6] ............................................... G06K 9/34
[52] U.S. Cl. ............................................ 382/176; 358/462
[58] Field of Search ................................. 382/173, 176, 382/282, 164, 171, 273; 358/453, 462, 452, 456, 464

[56] References Cited

U.S. PATENT DOCUMENTS

| 4,403,257 | 9/1983 | Hsieh ..................................... 358/283 |
| 5,025,481 | 6/1991 | Ohuchi ................................... 382/176 |
| 5,193,122 | 3/1993 | Kowalski et al. ...................... 382/173 |
| 5,341,227 | 8/1994 | Kumashiro ............................. 382/173 |
| 5,587,808 | 12/1996 | Hagihara et al. ..................... 358/462 |
| 5,617,485 | 4/1997 | Ohuchi et al. ......................... 382/176 |

FOREIGN PATENT DOCUMENTS 0 236 594   9/1987   European Pat. Off. .
291 000   11/1988   European Pat. Off. .

OTHER PUBLICATIONS

European Search Report.

Primary Examiner—Leo H. Boudreau
Assistant Examiner—Bhavesh Mehta
Attorney, Agent, or Firm—Beveridge, DeGrandi, Weilacher & Young, L.L.P.

[57] ABSTRACT

An apparatus for and a method of detecting a dotted image area in an image. It is judged on the basis of image data corresponding to pixels in a first judging area which includes a predetermined number of pixels including a target pixel whether or not the target pixel is a peculiar point pixel (a peak pixel or a dip pixel). Further, it is judged on the basis of image data corresponding to pixels in a second judging area which is larger than the first judging area whether or not the target pixel is a peculiar point pixel. The dotted image area in the image is detected on the basis of the results of judgment related to the first judging area and the second judging area.

12 Claims, 6 Drawing Sheets

FIG. 3

| A | B | C |
|---|---|---|
| D | X | E |
| F | G | H |

FIG. 4

| A | – | B | C | – |
|---|---|---|---|---|
| – | D | X | – | E |
| F | – | G | H | – |

FIG. 5

| a | b | c |
|---|---|---|
| d | x | e |
| f | g | h |

FIG. 8

| A | – | B | – | C |
|---|---|---|---|---|
| D | – | X | – | E |
| F | – | G | – | H |

FIG. 9

| A | – | B | – | C |
|---|---|---|---|---|
| – | – | – | – | – |
| D | – | X | – | E |
| – | – | – | – | – |
| F | – | G | – | H |

APPARATUS FOR AND METHOD OF DETECTING DOTTED IMAGE AREA USING TWO TYPES OF JUDGING AREAS

BACKGROUND OF THE INVENTION

1. Field of the Invention

The present invention relates to an apparatus for and a method of detecting a dotted image area in an image.

2. Description of the Related Art

A color digital copying machine includes a scanner which is constituted by a CCD (Charge Coupled Device) or the like. The scanner optically reads a color original for each very small pixel, and converts the color original into red (R), green (G) and blue (B) electric signals. The electric signals are converted into digital image data, and the digital image data are stored in a memory. The color digital copying machine has the function of judging to which of a character or line area, a dotted image area and a picture area belongs each of areas of an original on the basis of the image data to perform image processing corresponding to the type of area.

For example, the image in the character or line area is subjected to emphasis such as edge emphasis or emphasis of a black character. In addition, the image in the dotted image area is subjected to smoothing processing.

It is judged in the following manner whether or not an area to be judged belongs to a dotted image area. The area judgment is made by successively taking pixels constituting a read image as a target pixel. A judging area including a predetermined number of pixels (for example, three pixels by three pixels) which are continuous centered with respect to the target pixel is set. It is judged whether the density of the target pixel is higher or lower than the densities of the pixels around the target pixel. If the target pixel is denser than the pixels around the target pixel, the target pixel is judged to be a peak pixel. On the other hand, if the target pixel is thinner than the pixels around the target pixel, the target pixel is detected as a dip pixel.

A plurality of peak pixels and dip pixels are thus detected. It is judged whether an area to be judged belongs to a dotted image area by examining whether or not the spacing between detected peak pixels or the spacing between detected dip pixels is suitable or whether or not the pitch between a pair of peak pixels or a pair of dip pixels is substantially fixed.

There are various types of dotted images. The number of rows of dots per inch (hereinafter referred to as "ruling") is not constant. Specifically, the ruling of a fine dotted image is approximately 200. On the other hand, the ruling of a coarse dotted image is approximately 65. In an original having a small ruling less than approximately 100, the dots area may stick out of pixels detected by the scanner. In such a case, in the above described method of detecting the peak pixels or the dip pixels, the peak pixels or the dip pixels cannot be accurately detected, whereby erroneous detection may occur in many cases.

On the other hand, in an original having a large ruling less than approximately 100, a judging area may include a lot of peak pixels or dip pixels unless a relatively narrow judging area including pixels which are continuous centered with respect to a target pixel is employed as conventionally, thereby making it impossible to substantially detect peak/dip pixels.

SUMMARY OF THE INVENTION

An object of the present invention is to provide a dotted image area detecting apparatus capable of reliably detecting peculiar point pixels (peak/dip pixels) irrespective of the size of dots and consequently, capable of accurately detecting a dotted image area.

Another object of the present invention is to provide a dotted image area detecting method in which peculiar point pixels (peak/dip pixels) can be reliably detected irrespective of the size of dots and consequently, a dotted image area can be accurately detected.

According to the present invention, pixels constituting an image are successively processed as a target pixel on the basis of image data corresponding to each of the densities of the pixels. A first judging area including a predetermined number of pixels including the target pixel is set. It is judged whether or not the target pixel is a peculiar point pixel on the basis of image data corresponding to pixels in the first judging area. Further, a second judging area which includes a predetermined number of pixels including a target pixel and is larger than the first judging area is set. It is judged whether or not the target pixel is a peculiar point pixel on the basis of image data corresponding to pixels in the second judging area. The dotted image area is detected on the basis of the result of judgment based on the image data corresponding to the pixels in the first judging area and the result of judgment based on the image data corresponding to the pixels in the second judging area.

The two types of (wide and narrow) judging areas are thus set, thereby making it possible to detect peculiar point pixels on the basis of the image data corresponding to the pixels in the set judging areas. Consequently, even if the pitch between dots constituting the dotted image area is large, it is possible to accurately detect the peculiar point pixels. The peculiar point pixels may include both or one of peak pixels and dip pixels.

In detecting the dotted image area, either one of the result of judgment based on the image data corresponding to the pixels in the first judging area and the result of judgment based on the image data corresponding to the pixels in the second judging area may be selected to detect the dotted image area in the image on the basis of the selected result of judgment. In this case, it is preferable that the coarseness of the dotted image area is detected, and the result of judgment is selected depending on the detected coarseness of the dotted image area.

The coarseness of the dotted image area is detected by giving an attribute to each of the pixels depending on whether or not the density of the target pixel is higher than the average value of the densities of the pixels in predetermined positions around the target pixel and judging whether or not the pitch between dots is large on the basis of the pitch between change points of the given attribute.

In this case, it is preferable that an area where the pitch between the change points of the attribute has no predetermined periodicity does not belong to a dotted image area.

Furthermore, the dotted image area may be detected by detecting the dotted image area on the basis of the result of judgment based on the data corresponding to the pixels in the first judging area in parallel with the dotted image area detection on the basis of the result of judgment based on the data corresponding to the pixels in the second judging area, to judge whether or not a predetermined detecting area belongs to a dotted image area on the basis of the two results of detection.

Furthermore, it is preferable that the second judging area is one obtained by extending the first judging area in the direction of a line without changing the number of lines. Consequently, it is possible to set two types of judging areas having different dimensions without increasing the number of storable lines in storing means for storing image data, as compared with that in a case where the judging area is extended in both the transverse and longitudinal directions. Consequently, the capacity of a memory storing image data for detecting a dotted image area need not be increased.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing a three by three matrix area which is one example of a judging area centered around a target pixel;

FIG. 4 is a diagram showing a five by three matrix area which is one example of a wide judging area centered around a target pixel;

FIG. 5 is a diagram showing a matrix for detecting the pitch between dots constituting a dotted image area;

FIG. 8 is a diagram showing another matrix of a wide judging area; and

FIG. 9 is a diagram showing another matrix of a wide judging area.

DESCRIPTION OF THE PREFERRED EMBODIMENTS

Figure 1:
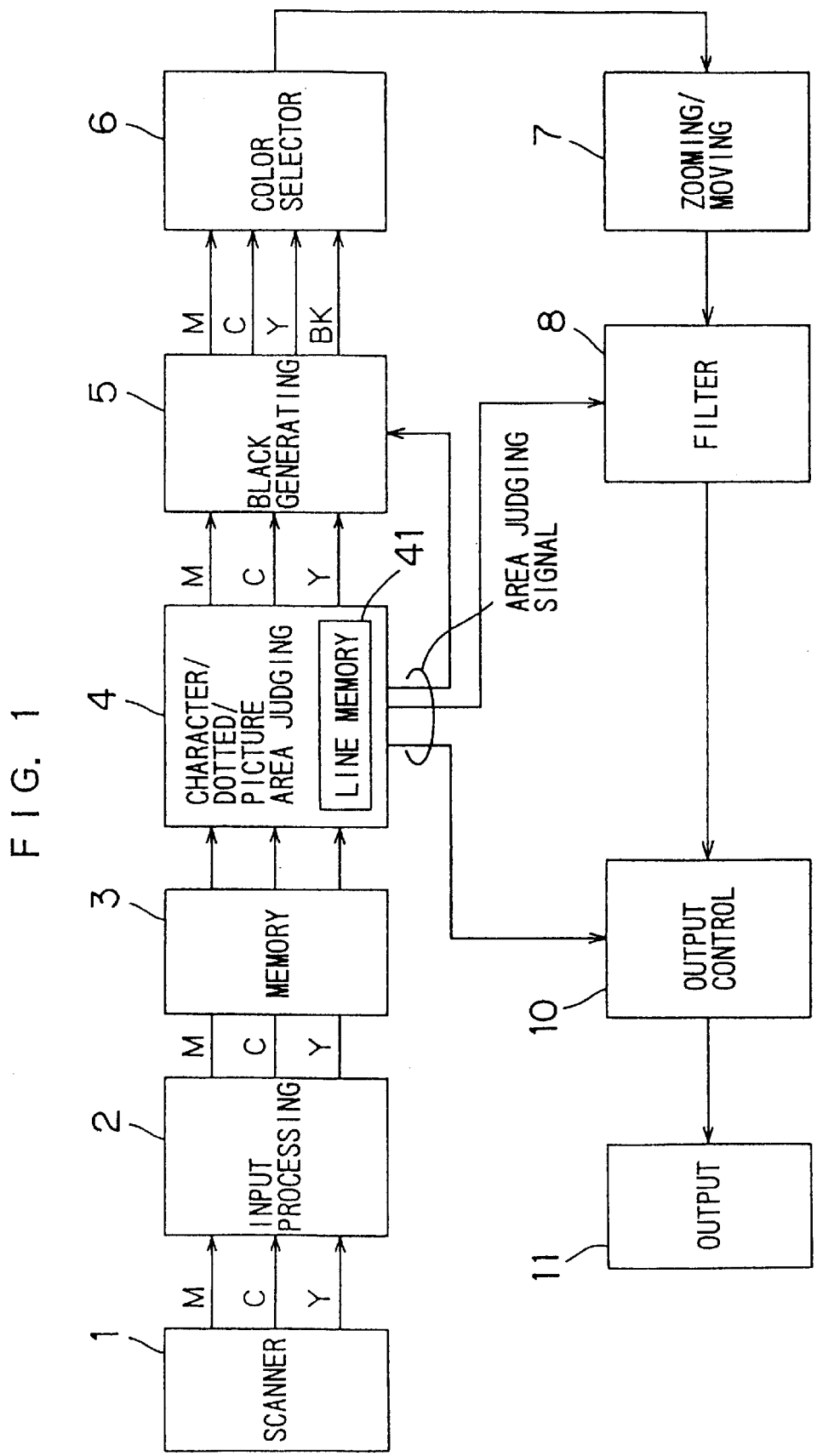
FIG. 1 is a block diagram showing the electrical construction of a principal part of a color digital copying machine to which one embodiment of the present invention is applied.

FIG. 1 is a block diagram showing the electrical construction of a principal part of a color digital copying machine to which a first embodiment of the present invention is applied.

The color digital copying machine comprises a scanner 1 which is constituted by a CCD (Charge Coupled Device). The scanner 1 scans a color original in one direction (hereinafter referred to as the horizontal scanning direction, reads the color original for each very small pixel, and converts the color original into signals corresponding to the three primary colors, that is, yellow (Y), magenta (M) and cyan (C). The resolution of the scanner 1 may be approximately 400 pixels per inch.

The Y, M and C primary-color signals are converted into digital image data, after which the digital image data are subjected to correction processing corresponding to the characteristics of toner, for example, by an input processing circuit 2. Image data after the processing are temporarily stored in an FIFO (First-In First-Out) memory 3. The image data corresponding to a predetermined number of lines (for example, three lines) selected for judging the type of area out of the stored image data are transferred to a character/dotted/picture area judging circuit 4, and are stored in a line memory 41 inside thereof. The character/dotted/picture area judging circuit 4 judges to which of a character or line area, a dotted image area and a picture area belongs in an area to be processed.

On the other hand, the Y, M and C primary-color image data are supplied to a black generating circuit 5, where black (BK) data for compensating for density insufficiency in a high density original is generated.

Further, the image data for the four colors Y, M, C and BK are taken out for each color by a color selector circuit 6, and are supplied to a zooming/moving circuit 7, where the image data are converted into data corresponding to the set magnification or the like. In a filter circuit 8, the image data are subjected to smoothing or edge sharpening depending on the type of area judged.

The image data are finally outputted to an output section 11 such as a laser printer section through an output control circuit 10.

Description is now made of the details of the function of judging a dotted image area in the character/dotted/picture area judging circuit 4.

Figure 2:
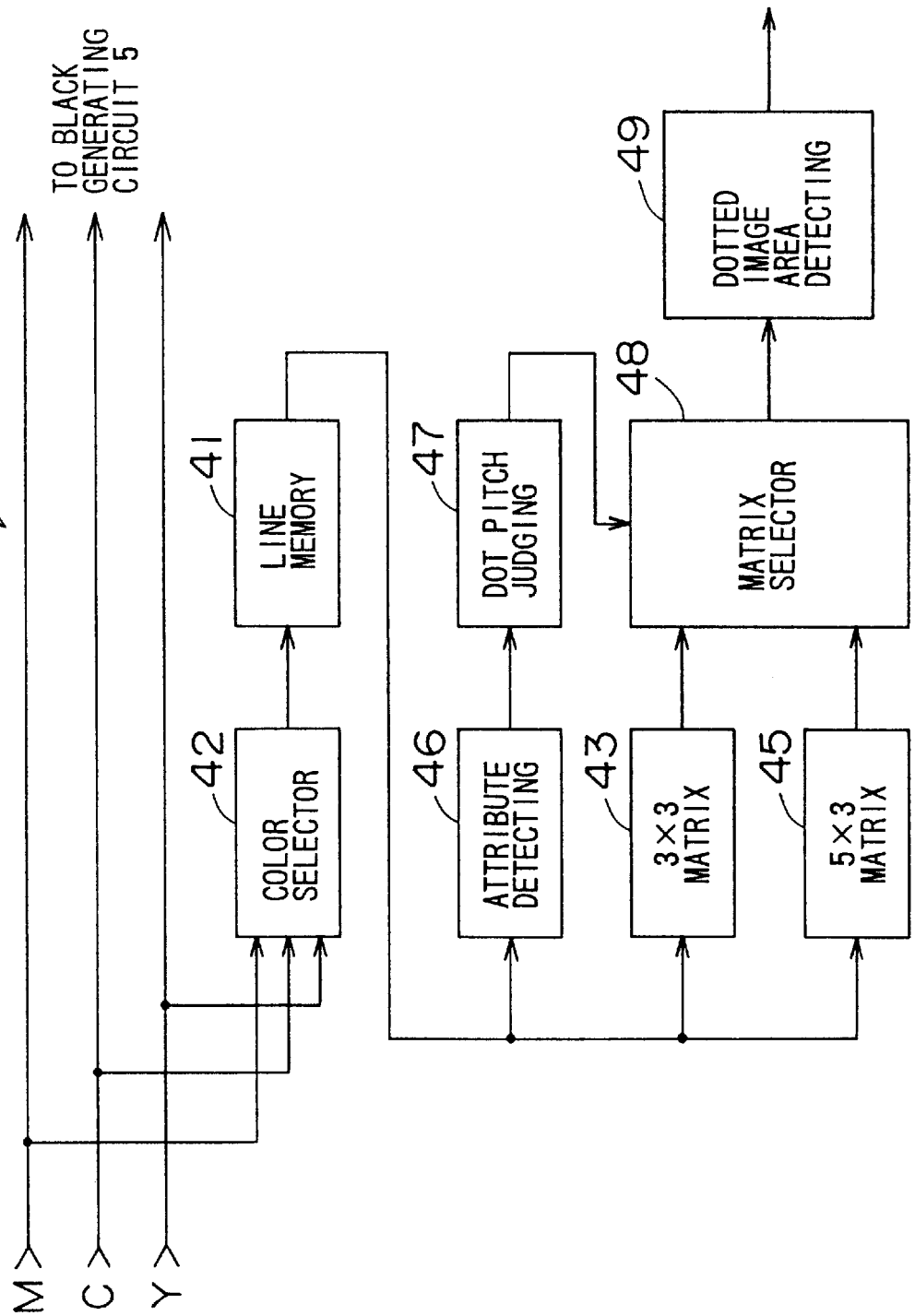
FIG. 2 is a block diagram showing the construction of a principal part of a character/dotted/picture area judging circuit.

FIG. 2 is a block diagram showing the construction of a principal part of the character/dotted/picture area judging circuit 4.

The image data for the three colors are fed to the black generating circuit 5, and the image data for one of the three colors is selected by a color selector 42 and is temporarily stored in a line memory 41. The image data corresponding to three lines which are temporarily stored in the line memory 41 are fed in parallel to a 3×3 matrix processing section 43 and a 5×3 matrix processing section 45. The 3×3 matrix processing section 43 utilizes a matrix with three pixels by three lines shown in FIG. 3, to detect peak pixels and dip pixels. The 5×3 matrix processing section 45 utilizes a matrix with five pixels by three lines shown in FIG. 4, to detect peak pixels and dip pixels in parallel with the detection by the 3×3 matrix processing section 43. In this case, pixels on the middle line out of the three lines whose image data are stored in the line memory 41 are successively taken as a target pixel X and are processed.

Figures 3, 4, 5:
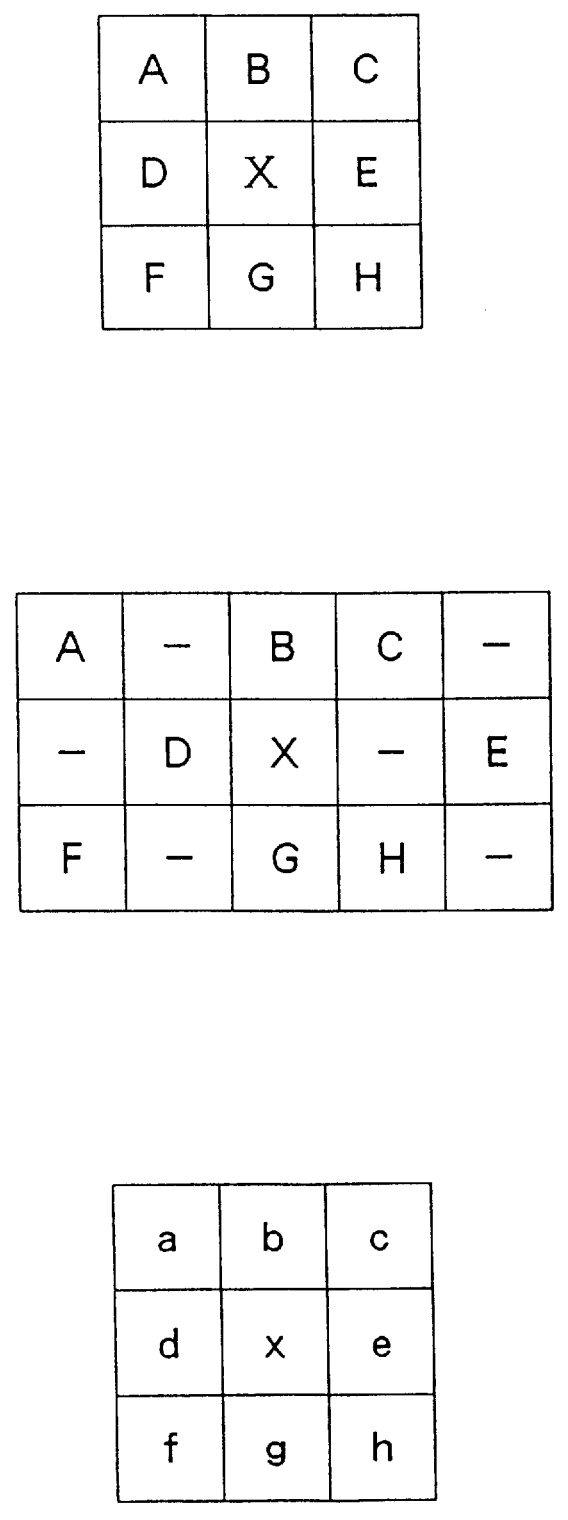
Figures 8, 9:
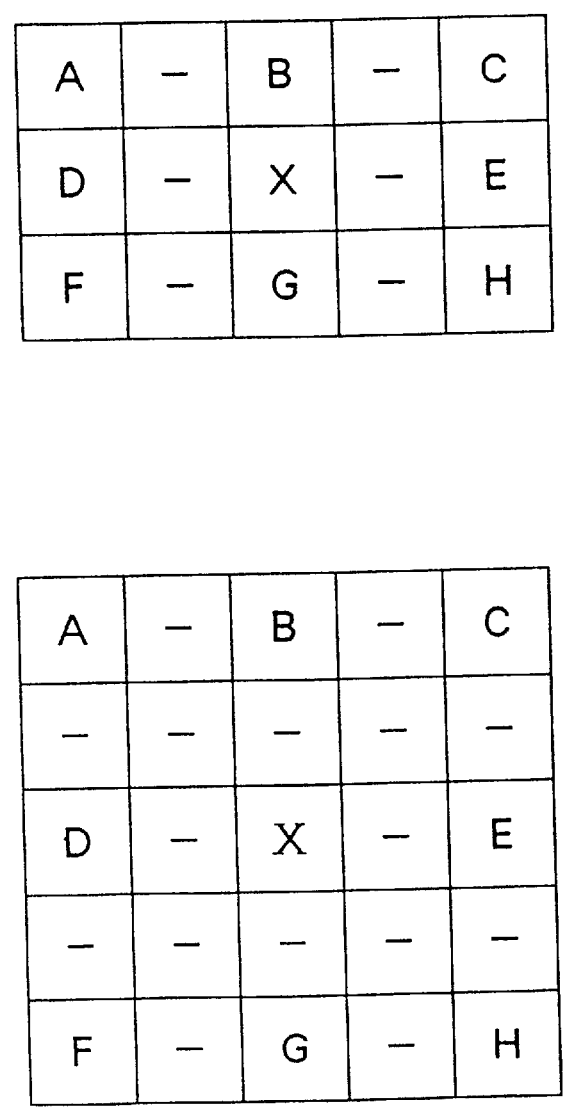

The matrix with five pixels by three lines shown in FIG. 4 has such a shape that the matrix shown in FIG. 3 is extended in the horizontal scanning direction. In addition, in the matrix with five pixels by three lines shown in FIG. 4, an arrangement of eight processing pixels A to H of which image data are used for processing related to the target pixel X is so devised that the pixels do not line up in the longitudinal and transverse directions. The reason for this is that if the processing pixels are arranged in a straight line in the longitudinal and transverse directions as shown in FIG. 8, the processing pixels in one column slip off altogether. In this case, there exist no processing pixels on straight lines intersecting the target pixel X obliquely at an angle of 45°, whereby erroneous detection may occur.

In a case where the three by three matrix shown in FIG. 3 is used, if the density of the target pixel X in the center is higher than the densities of pixels B, C, D and H around the target pixel X, and if a value obtained by subtracting a predetermined value from the density of the target pixel X is higher than the densities of pixels A, E, F and G around the target pixel X, it is judged that the target pixel X is a peak pixel. On the other hand, if the density of the target pixel X in the center is lower than the densities of the pixels B, C, D and H around the target pixel X, and if a value obtained by adding a predetermined value to the density of the target pixel X is lower than the densities of the pixels A, E, F and G around the target pixel X, it is judged that the target pixel X is a dip pixel. The above described predetermined value is preferably set to "5", for example, since such great change in image data is characteristic to dotted image areas. Consequently, it is possible to detect the edges of the dots.

In a case where the five by three matrix shown in FIG. 4 is used, if the density of the target pixel X in the center is higher than the densities of pixels B, C, D and H around the target pixel X, and if a value obtained from subtracting a predetermined value from the density of the target pixel X is higher than the densities of pixels A, E, F and G around the target pixel X, it is judged that the target pixel X is a peak pixel. On the other hand, if the density of the target pixel X in the center is lower than the densities of the pixels B, C, D and H around the target pixel X, and if a value obtained by adding a predetermined value to the density of the target pixel X is lower than the densities of the pixels A, E, F and G around the target pixel X, it is judged that the target pixel X is a dip pixel. The above described predetermined value is preferably set to "5", for example. Consequently, it is possible to detect the edges of dots.

Such processing is performed by successively taking, as a target pixel, pixels on the middle line out of the three lines whose image data are temporarily stored in the line memory 41.

On the other hand, it must be determined which of the results of judgment using the above described two types of matrixes should be employed for dotted image area judgment. This determination is made by detecting the pitch between dots constituting a dotted image area, as described later, and depending on the results of the detection.

In order to judge whether or not the pitch between dots is large, the character/dotted/picture area judging circuit 4 comprises an attribute detecting section 46 and a dot pitch judging section 47, as shown in FIG. 2. The attribute detecting section 46 uses a mask of a three by three matrix centered around a target pixel x, as shown in FIG. 5. The attribute detecting section 46 operates the average value AVE of the densities of pixels a, c, f and h in four corners of the matrix. If the density of the target pixel x is higher than the average value AVE, the attribute detecting section 46 gives an attribute "1" to the target pixel x. If the density of the target pixel x is lower than the average value AVE, an attribute "0" is given to the target pixel x. The same processing is performed by shifting the target pixel x along a line.

Figure 6:
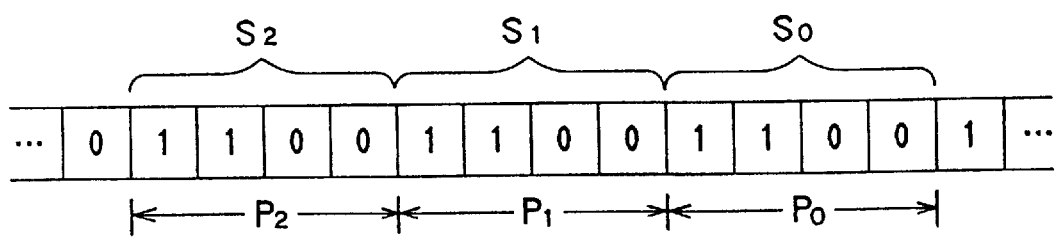
FIG. 6 is a diagram showing a queue of attributes (0, 1) of a target pixel x for detecting the pitch between dots constituting a dotted image area.

The dot pitch judging section 47 produces a queue of attributes obtained, as shown in FIG. 6, on the basis of an output of the attribute detecting section 46. The queue is sectioned for each position at which the attributes constituting the queue are raised from "0" to "1", to produce areas $S_0, S_1, S_2, \ldots$. The lengths (the pitches) of the respective areas are taken as $p_0, p_1, p_2, \ldots$.

It is judged by paying attention to a certain area whether or not the pitch between dots is coarse. The area paid attention to is referred to as a feedback area. For example, if the area $S_0$ is a feedback area, the dot pitch judging section 47 examines whether or not the conditions indicated by the following expressions (1), (2), (3) and (4) hold with respect to the area $S_1$ preceding the area $S_0$ and the area $S_2$ preceding the area $S_1$:

$$p_1 \leq 10 \qquad (1)$$

$$p_2 \leq 10 \qquad (2)$$

$$|p_1 - p_2| \leq 1 \qquad (3)$$

$$(p_1 + p_2)/2 > 4 \qquad (4)$$

When all the conditions indicated by the foregoing expressions (1), (2), (3) and (4) hold, it is judged that the pitch is large. The dot pitch judging section 47 controls a matrix selector 48 for selecting one of the result of processing by the 3×3 matrix processing section 43 and the result of processing by the 5×3 matrix processing section 45 and outputting the selected result of processing. Consequently, the result of judgment using the five by three matrix (see FIG. 4) is employed with respect to pixels constituting the area $S_0$.

If the conditions indicated by the foregoing expressions (1), (2) and (3) hold but the condition indicated by the foregoing expressions (4) does not hold, it is judged that the pitch is small. The dot pitch judging section 47 controls the matrix selector 48 so as to employ the result of judgment using the three by three matrix (see FIG. 3) with respect to the pixels constituting the area $S_0$ on the basis of the judgment.

When the conditions indicated by the foregoing expressions (1), (2) and (3) do not hold, it is judged that an area to be judged does not belong to a dotted image area.

The foregoing expressions (1) and (2) indicate the condition that a pitch $p_1$ and a pitch $p_2$ are not more than 10. For example, the resolution of the scanner 1 shall be approximately 400 pixels per inch, and an original including a dotted image area shall be read at a screen angle of 90°. At this time, if the pitch is 10, the dotted image area is a very coarse dotted image area where the ruling is 40. In a case where an original including a dotted image area is read at a screen angle of 45°, if the pitch is 10, the dotted image area is a coarse dotted image area where the ruling is approximately 60. Such coarse dotted image area is not regarded as a dotted image area in this embodiment, in order not to erroneously detect a character area as a dotted image area.

The condition indicated by the foregoing expression (3) is the condition that an area to be judged shall not be regarded as a dotted image area in view of the periodicity of the pitch if the pitch greatly varies.

The condition indicated by the foregoing expression (4) is the condition paying attention to the pitch itself. A numeral "4" corresponds to a dotted image area where the ruling is 100. The ruling of the dotted image area is less than 100 if the pitch is more than four, while being more than 100 if the pitch is less than four.

Such processing is performed for each area on the middle line out of the three lines whose image data are temporarily stored in the line memory 41. In addition, when processing with respect to the line whose image data are temporarily stored in the line memory 41 is completed, the same processing is performed with respect to the succeeding line.

The dotted image area detecting section 49 sets a predetermined detecting area and judges whether or not the detecting area belongs to a dotted image area on the basis of the result selected by the matrix selector 48 out of the results of judgment using the two types of matrices, thereby detecting the dotted image area. For example, if the total number of peak pixels and dip pixels in a detecting area having predetermined dimensions (for example, nine pixels by four lines) is not less than a predetermined value (for example, four), it may be judged that the detecting area belongs to a dotted image area.

According to the present embodiment, peak/dip pixels are thus detected using a small judging matrix area including a predetermined number of pixels (9) (see FIG. 3) and a wide area detecting matrix area including a predetermined number of pixels (9) which is constructed by extending the small judging matrix area in the line direction without changing the number of processing pixels (see FIG. 5). Therefore, it is possible to reliably detect the peak/dip pixels even with respect to a dotted image area where peak/dip pixels are coarsely arranged.

Furthermore, according to the present embodiment, a queue of attributes given to the target pixel x is formed and is sectioned for each position at which the attributes are raised from "0" to "1", to produce areas $S_0, S_1, S_2, \ldots$, and it is judged whether a dotted image area is fine or coarse on the basis of the relationship among the lengths (pitches) $p_0$, $p_1, p_2, \ldots$ of the respective areas. Consequently, it is possible to accurately detect the fineness of the dotted image area, whereby the two types of detecting matrix areas (see FIGS. 3 and 4) are suitably selected. As a result, it is possible to reliably detect peak/dip pixels without depending on whether the peak/dip pixels are arranged coarsely or finely.

Since the peak/dip pixels can be thus reliably detected, thereby making it possible to satisfactorily detect the dotted image area.

Figure 7:
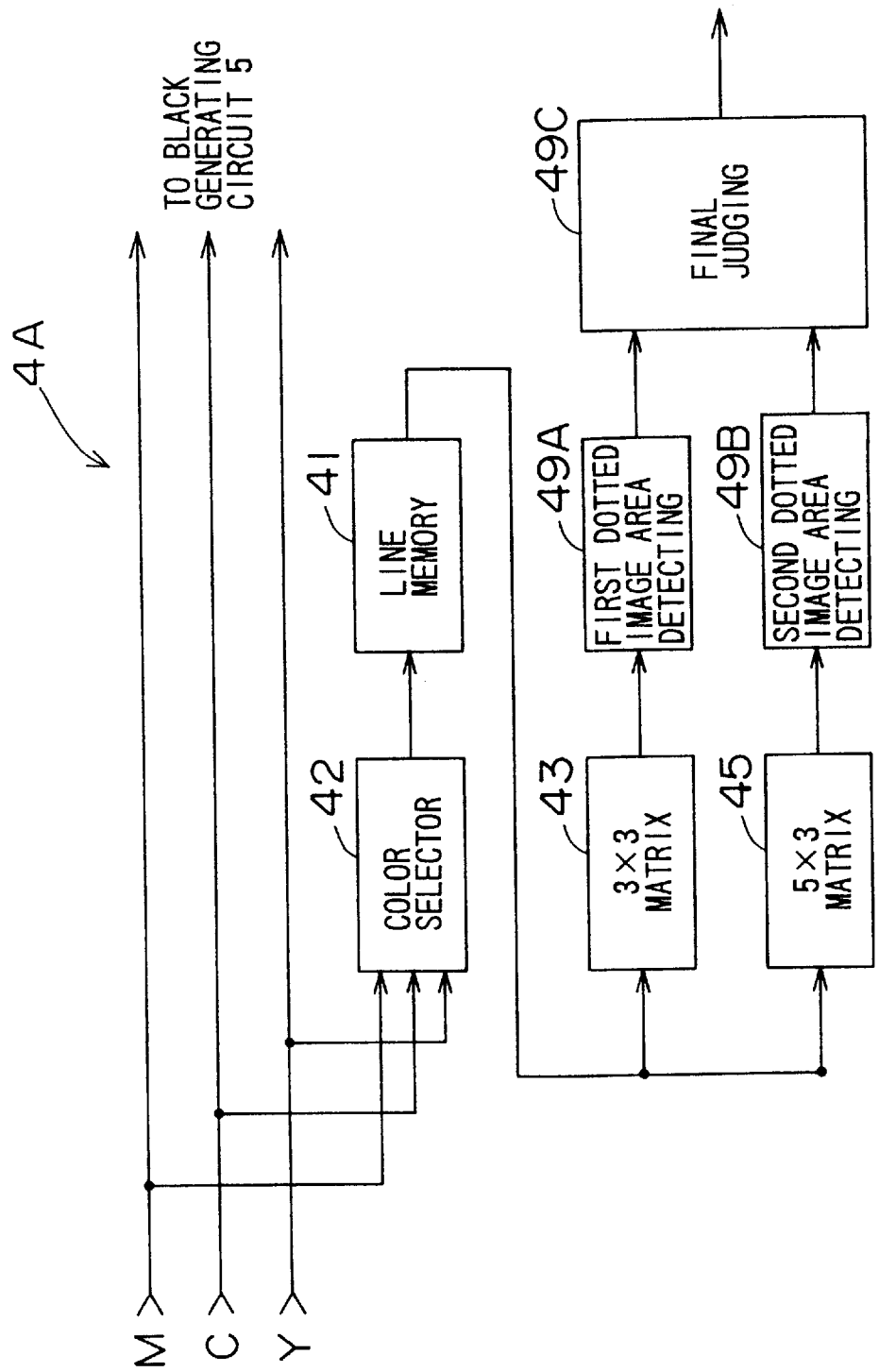
FIG. 7 is a block diagram showing the construction of a principal part of a character/dotted/picture area judging circuit according to another embodiment of the present invention.

FIG. 7 is a block diagram showing the construction of a principal part of a character/dotted/picture area judging circuit 4A, which is to be used in place of the above described character/dotted/picture area judging circuit 4, in a second embodiment of the present invention. In FIG. 7, sections having the same functions as those shown in FIG. 2 are assigned the same reference numerals.

In the present embodiment, a dotted image area is detected by a first dotted image area detecting section 49A on the basis of peak pixels and dip pixels which are detected by processing in a 3×3 matrix processing section 43. In addition, a dotted image area is detected by a second dotted image area detecting section 49B on the basis of peak pixels and dip pixels which are detected by processing in a 5×3 matrix processing section 45. The dotted image area detection by the first and second dotted image area judging sections 49A and 49B is the same as the dotted image area detection by the above described dotted image area detecting section 49.

The detection results by the first dotted image area detecting section 49A and the second dotted image area detecting section 49B are given to a final judging section 49C. If it is judged that a detecting area belongs to a dotted image area by at least one of the first and second dotted image area detecting sections 49A and 49B, the final judging section 49C judges that the detecting area belongs to a dotted image area. In addition, if it is judged that both the first and second dotted image area detecting sections 49A and 49B judge that a detecting area does not belong to a dotted image area, it is judged that the detecting area does not belong to a dotted image area.

Such construction attains the same function and effect as those in the above described case of the first embodiment.

The present invention is not limited to the above described embodiments. Although in the above described embodiments, a wide detecting matrix area (5×3, see FIG. 4) is so adapted that pixels do not line up in the longitudinal and transverse directions by devising an arrangement of eight pixels, peak/dip pixels can be reliably detected in a coarse dotted image area even if such an arrangement that pixels line up in the longitudinal and transverse directions is employed, as shown in FIG. 8. In addition, a five by five matrix extending in not only the horizontal scanning direction but also the vertical scanning direction, as shown in FIG. 9, may be used, although the number of storable lines in the line memory 41 is increased.

Furthermore, although in the above described embodiments, description has been made of a digital color copying machine by way of example, the present invention is also applicable to another image processing apparatus requiring processing for judging whether each area in an original image is a dotted image area, for example, a digital monochrome copying machine, a color/monochrome facsimile or a color/monochrome printer.

Although the present invention has been described and illustrated in detail, it is clearly understood that the description is by way of illustration and example only and is not to be taken by way of limitation, the spirit and scope of the present invention being limited only by the terms of the appended claims.

What is claimed is:

1. A dotted image area detecting apparatus for successively processing pixels constituting an image as a target pixel on the basis of image data representing densities of the pixels to detect a dotted image area in the image, the apparatus comprising:

first judging means including means for setting a first judging area which has a predetermined number of pixels including a target pixel, and means for judging whether or not the target pixel is a peculiar point pixel on the basis of image data corresponding to pixels in the first judging area;

second judging means including means for setting a second judging area which has a predetermined number of pixels including a target pixel and is larder than the first judging area, and means for judging whether or not the target pixel is a peculiar point pixel on the basis of image data corresponding to pixels in the second judging area; and dotted image area detecting means for detecting a dotted image area in the image on the basis of a result of judgment by the first judging means and a result of judgment by the second judging means, wherein the dotted image area detecting means includes coarseness detecting means for detecting a coarseness of a dotted image area, selecting means, to which the result of judgment by the first judging means and the result of judgment by the second judging means are given, for selecting either one of the two results of judgment and outputting the selected result of judgment depending on the coarseness of the dotted image area detected by the coarseness detecting means, and means for detecting a dotted image area in the image on the basis of the result of judgment selected by the selecting means.

2. A dotted image area detecting apparatus according to claim 1, wherein the coarseness detecting means includes attribute detecting means for giving an attribute to each of the pixels depending on whether or not a density of the target pixel is higher than an average value of densities of the pixels in predetermined positions around the target pixel, and dot pitch judging means for judging whether or not a pitch between dots is large on the basis of a pitch between change points of the attribute given by the attribute detecting means.

3. A dotted image area detecting apparatus according to claim 2, further comprising means for judging that an area where the pitch between the change points of the attribute has no predetermined periodicity does not belong to a dotted image area.

4. A dotted image area detecting apparatus according to claim 1, further comprising storing means for storing image data in units of a predetermined number of lines, and wherein
the second judging area extends the first judging area in the direction of a line without changing the number of lines.

5. A dotted image area detecting apparatus according to claim 1, further comprising
storing means for storing image data in units of a predetermined number of lines, and wherein
the second judging area extends the first judging area in the direction of a line without changing the number of lines.

6. A dotted image area detecting apparatus for successively processing pixels constituting an image as a target pixel on the basis of image data representing densities of the pixels to detect a dotted image area in the image, the apparatus comprising:
first judging means including means for setting a first judging area which has a predetermined number of pixels including a target pixel, and means for judging whether or not the target pixel is a peculiar point pixel on the basis of image data corresponding to pixels in the first judging area;
second judging means including means for setting a second judging area which has a predetermined number of pixels including a target pixel and is larger than the first judging area, and means for judging whether or not the target pixel is a peculiar point pixel on the basis of image data corresponding to pixels in the second judging area; and
dotted image area detecting means for detecting a dotted image area in the image on the basis of a result of judgment by the first judging means and a result of judgment by the second judging means, wherein
the dotted image area detecting means includes
first detecting means for detecting a dotted image area on the basis of the result of judgment by the first judging means,
second detecting means for detecting a dotted image area on the basis of the result of judgment by the second judging means, and
judging means for judging whether or not a predetermined detecting area belongs to a dotted image area on the basis of a result of detection by the first detecting means and a result of detection by the second detecting means.

7. A dotted image area detecting method for successively processing pixels constituting an image as a target pixel on the basis of image data representing each of densities of the pixels to detect a dotted image area in the image, the method comprising the steps of:
setting a first Judging area which includes a predetermined number of pixels including a target pixel;
judging whether the target pixel is a peculiar point pixel on the basis of image data corresponding to pixels in the first judging area;
setting a second judging area which includes a predetermined number of pixels including a target pixel and is larger than the first judging area;
judging whether or not the target pixel is a peculiar point pixel on the basis of image data corresponding to pixels in the second judging area; and
detecting a dotted image area in the image on the basis of a result of judgment based on the image data corresponding to the pixels in the first judging area and a result of judgment based on the image data corresponding to the pixels in the second judging area, wherein
the step of detecting a dotted image area includes the steps of
detecting a coarseness of a dotted image area,
selecting either one of the result of judgment based on the image data corresponding to the pixels in the first judging area and the result of judgment based on the image data corresponding to the pixels in the second judging area depending on the detected coarseness of a dotted image area, and
detecting a dotted image area in the image on the basis of the selected result of judgment.

8. A method according to claim 7, wherein
the step of detecting a coarseness of a dotted image area includes the steps of
giving an attribute to each of the pixels depending on whether or not a density of the target pixel is higher than an average value of densities of pixels in predetermined positions around the target pixel, and
judging whether or not a pitch between dots is large on the basis of a pitch between change points of the given attribute.

9. A method according to claim 8, further comprising
the step of judging that an area where the pitch between the change points of the attribute has no predetermined periodicity does not belong to a dotted image area.

10. A method according to claim 7, wherein
the second judging area is obtained by extending the first judging area in the direction of a line without changing the number of lines.

11. A dotted image area detecting method for successively processing pixels constituting an image as a target pixel on the basis of image data representing each of densities of the pixels to detect a dotted image area in the image, the method comprising the steps of:
setting a first Judging area which includes a predetermined number of pixels including a target pixel;
judging whether the target pixel is a peculiar point pixel on the basis of image data corresponding to pixels in the first judging area;
setting a second Judging area which includes a predetermined number of pixels including a target pixel and is larger than the first judging area;
judging whether or not the target pixel is a peculiar point pixel on the basis of image data corresponding to pixels in the second judging area; and
detecting a dotted image area in the image on the basis of a result of judgment based on the image data corresponding to the pixels in the first judging area and a result of judgment based on the image data corresponding to the pixels in the second judging area, wherein
the step of detecting a dotted image area includes
a first detecting step for detecting a dotted image area on the basis of the result of judgment based on the image data corresponding to the pixels in the first judging area,
a second detecting step of detecting a dotted image area on the basis of the result of judgment based on the image data corresponding to the pixels in the second judging area, and
a step of judging whether or not a predetermined detecting area belongs to a dotted image area on the basis of a result of detection in the first detecting step and a result of detection in the second detecting step.

12. A method according to claim 11, wherein
the second judging area is obtained by extending the first judging area in the direction of a line without changing the number of lines.

* * * * *